C. K. MYERS.
Wheels for Harvesters.

No. 156,672. Patented Nov. 10, 1874.

Witnesses
John Warren
Artemas A. Martin

Charles K. Myers
by E. Thurlow, his atty in fact

UNITED STATES PATENT OFFICE.

CHARLES K. MYERS, OF PEKIN, ILLINOIS, ASSIGNOR OF ONE-HALF HIS RIGHT TO ANDREW J. HODGES, OF PEORIA, ILLINOIS.

IMPROVEMENT IN WHEELS FOR HARVESTERS.

Specification forming part of Letters Patent No. 156,672, dated November 10, 1874; application filed October 12, 1874.

*To all whom it may concern:*

Be it known that I, CHARLES K. MYERS, of the city of Pekin, in the county of Tazewell and in the State of Illinois, have invented a Combined Rotary Axle and Hub for Harvesters or other Wheels; and do hereby declare that the following is a full, clear, and exact description thereof, reference being had to the annexed drawings, making a part of this specification, in which like letters of reference refer to like parts, and in which—

Figures 1, 2:
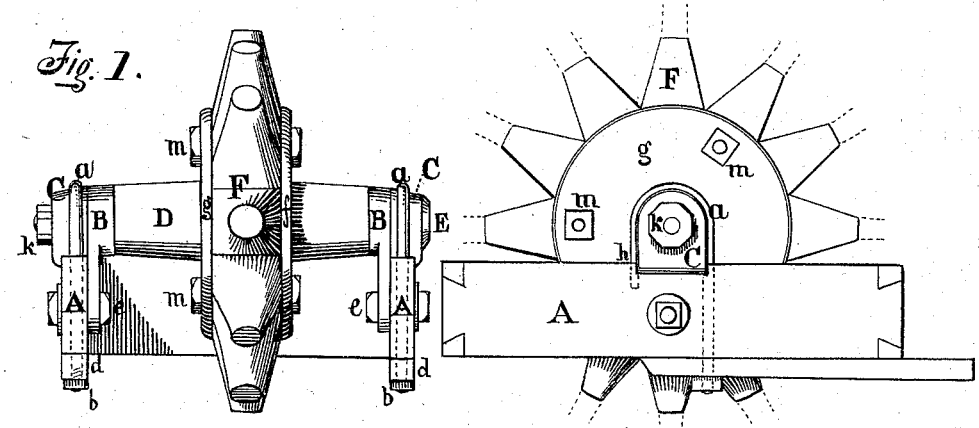
Figures 3, 4:
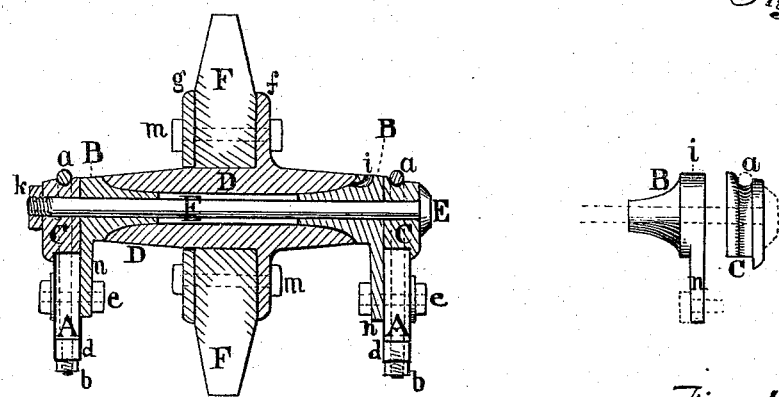
Figure 5:
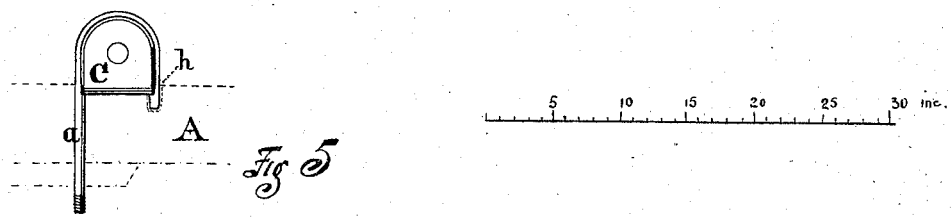

Figure 1 represents a longitudinal elevation of the combined hub and axle; Fig. 2, a side elevation; Fig. 3, a vertical section through the center; Fig. 4, side elevation of hub-bearing and end-block.

This is a combination of a wheel-hub and axle; and consists of a cylinder, mounted at either end upon a conical iron bearing which enters a gradually-contracting opening in the end of the hub. The surfaces in contact are of chilled iron, and the two conical bearings are kept in place by a long bolt passing through the hub and cones and secured on the outside by a nut which also serves the purpose of bringing the conical bearings nearer together to remedy any possible wear, and to insure freedom from any lateral oscillating motion, jostling, or shaking. The cones are mounted upon parallel horizontal beams, forming part of the supporting-frame of a harvester or similar machine. These beams may be substituted by an axle so constructed as to carry a stationary conical bearing for one end of the hub and an adjustable conical bearing for the other end with the same advantages.

One of the forms in which I construct my invention is as follows: In the drawings, A A represent two parallel beams of the frame of a harvester, to which the hub-bearings B B and their accompanying blocks C C are bolted and adjusted. B B are two conical-shaped interior bearings with in-curved surfaces, and attached to each beam A A by bolts or other ajustable fastenings, which pass through the arms $n$ $n$. Each bearing enters one end of the hub D, each surface conforming exactly to that of the ends of the hub or axle, but the contact terminates at less than one third or fourth of the length of the hub, which contour resembles the palm-shaped capital of a Corinthian column divested of its leaves and volutes. Each bearing is pierced with an oil-passage, $i$. C C are iron blocks, one on the outside of bearing B B and resting upon the surface of its respective beam A A, through which and the bearings the long axle-bolt E passes. The blocks are each secured to a beam, A, by a staple, $a$, which rests at its curved upper end within a semicircular recess in the block, and, passing vertically downward through said beam, is secured beneath by a screw or nut, $b$. D is the combined axle and hub, made of chilled iron, (or, at least, its wearing surfaces,) hollow throughout to receive a bolt, E, through its axis, the diameter of this hollow being one-third of that of said axle or hub, and opening out at each end, as said, in a curve, to conform to the conical bearings B B. The hub is provided with a fixed flange, $f$, for the wheel, and a separate flange, $g$, (through which the hub passes,) which, after the spokes are in place, is bolted through the latter to the flange $f$; E, the axle-bolt which secures the whole together, passing through the bearings B B, blocks C C, and hub D.

The operation of the combined axle and hub is as follows: The extreme length of the hub confers the character of an axle upon it, tending to secure a more uniform verticity to the wheel, without the continual oscillation incident to hubs of a shorter proportion. The fixed flange $f$, forming one side of the spoke-box, and the movable fellow-flange $g$, allow of an easy application and retention of the spokes.

On the occurrence of wear of the surfaces in contact—which will be equal, or nearly so, over the whole of the same—the cones B B may be brought nearer to fill up any of such waste or wear by tightening the nut $k$ of the bolt E.

What I claim as my invention is—

1. The hub D, with funnel-shaped curved openings at either end, in combination with the conforming conical bearings B B and the central axial bolt E, substantially as and for the purposes described.

2. In combination with the bearings B B and the bolt E, end blocks C C with staples *a a*, for attachment to the beams A A, substantially as and for the purposes set forth.

In testimony that I claim the foregoing hub and axle I have hereunto set my hand this 28th day of September, 1874.

CHARLES K. MYERS.

Witnesses:
 FRANK SHAW,
 LORENZ SHAW.